US008006366B1

(12) United States Patent
Aboud

(10) Patent No.: US 8,006,366 B1
(45) Date of Patent: Aug. 30, 2011

(54) METHOD FOR MANUFACTURING SIMULATED BAMBOO

(76) Inventor: Moussa Aboud, Marysville, WA (US)

( * ) Notice: Subject to any disclaimer, the term of this patent is extended or adjusted under 35 U.S.C. 154(b) by 1223 days.

(21) Appl. No.: 11/634,542

(22) Filed: Dec. 5, 2006

Related U.S. Application Data

(60) Provisional application No. 60/742,753, filed on Dec. 6, 2005.

(51) Int. Cl.
*B23P 25/00* (2006.01)

(52) U.S. Cl. .......................................................... 29/458

(58) Field of Classification Search .................... 29/458, 29/428, 510, 511, 512, 515, 516, 522.1, 525.14; 138/103, 156, 158
See application file for complete search history.

(56) References Cited

U.S. PATENT DOCUMENTS 3,826,285 A * 7/1974 Reynolds ...................... 138/103
4,231,834 A 11/1980 Trejo Gonzalez ............ 156/294
6,938,987 B2 * 9/2005 Ellson et al. .................... 347/46

* cited by examiner

*Primary Examiner* — John C Hong
(74) *Attorney, Agent, or Firm* — Dean A. Craine

(57) ABSTRACT

This invention pertains to a method for preparing simulated bamboo from metal tubing that includes the following steps: (1) preparing a plurality of short segments of metal tubing; (2) creating a tapered wide opening on one end of each segment of metal tubing; (3) cutting an acute angle on the tapered wide opening; (4) longitudinally aligning two segments together by inserting the straight end of one segment into the tapered end of the second segment; (5) applying a flux to the joint of said segments; (6) joining the two short segments together; and, (7) grinding the outer surface of the joint to create a smooth surface. When the metal tubing is made of copper, or steel with copper-based metallic paint applied thereto, an oxidizing agent may be applied to the joint and the outer surfaces of the two short segments to product a circular black line around the joint and a green, brown color surface that simulates bamboo. When the metal tubing is made of steel, the segments are welded together. Paint is then applied to the outer surfaces or to the joint to simulate bamboo.

9 Claims, 5 Drawing Sheets

METHOD FOR MANUFACTURING SIMULATED BAMBOO

This is a utility patent application which claims benefit of U.S. Provisional Application No. 60/742,753 filed on Dec. 6, 2005.

BACKGROUND OF THE INVENTION

1. Field of the Invention

This invention pertains to a method for manufacturing simulated wood products, and more specifically to methods for manufacturing simulated bamboo used to construct furniture or other decorative items.

2. Description of the Related Art

Indoor and outdoor furniture and other types decorative items made of bamboo are very popular. Unfortunately, natural bamboo is relatively expensive and is less durable than other types of woods or materials (such as plastic or metal) commonly used to construct furniture.

Bamboo is a rapid growing, tubular plant with a green-brown trunk. Formed around the trunk, are characteristic growth nodules (called nodules) that appear as dark, circular bands which are approximately 6 to 12 inches apart. The transverse axis of each nodule is slightly tilted and the diameter of each nodule is slightly larger than the diameter of the shoot, thus creating a unique appearance. The pattern of colors and the angle of the nodule on each bamboo shoot have a unique appearance which thereby, makes each piece of furniture or decorative item distinctive.

Simulated bamboo made of metal or plastic, commonly found today, is constructed from molds or casts. Unfortunately, using metal or plastic does not closely resemble natural bamboo.

SUMMARY OF THE INVENTION

It is an object of the present invention to provide a method for manufacturing simulated bamboo shoots used for furniture and decorative items.

It is another object of the present invention to provide such a method of manufacturing such bamboo shoots that are made of metal for greater strength and durability.

These and other objects of the invention are met by the method for manufacturing simulated bamboo disclosed herein that uses short pieces of metallic tubing joined together to make a bamboo shoot. The method includes the following steps: (1) preparing a plurality of segments of metallic tubing; (2) creating a tapered wide end on each tube segment; (3) transversely cutting each tapered wide at an acute angle that simulates the angle of a nodule on a bamboo shoot; (4) longitudinally aligned and inserting the straight end of a tube segment into the tapered wide end of an adjacent tube segment; (5) welding the joint between the two short segments together. When copper tubing is used, the additional step of applying an oxidizing agent to the joint and to the outer surfaces of the two tube segments to produce a darkened circular line around the joint and a random green, brown color on the outer surfaces of said tube segments to simulate natural bamboo. When aluminum or steel tubing is used, an additional step of applying paint to the joint and to the outer surfaces is needed to simulate natural bamboo. The simulated bamboo shoots can then be cut, welded or connected together to make a large variety of indoor or outdoor furniture or decorative items.

DESCRIPTION OF THE PREFERRED EMBODIMENT(S)

Figure 1:
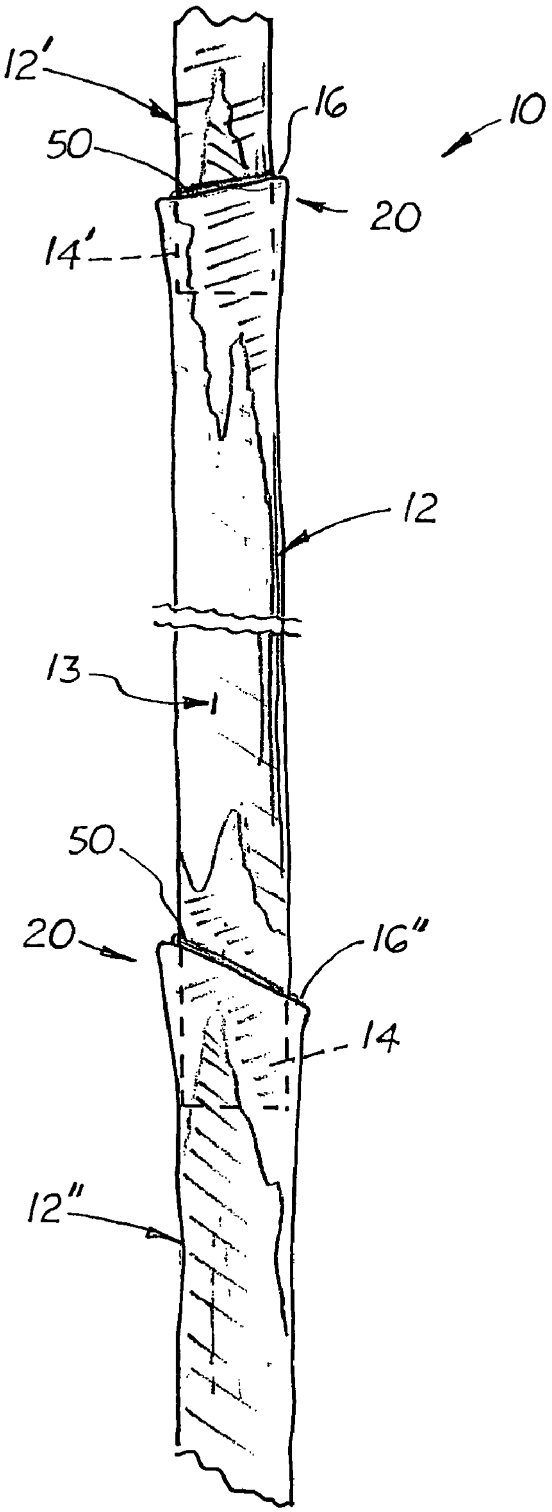
FIG. 1 is a front plan view of a section of bamboo shoot manufactured by the method disclosed herein.

Referring to the accompanying Figs., there is disclosed a method of manufacturing simulated bamboo using a plurality of short segments 12, 12' 12" of metallic tubing that are longitudinally aligned and connected together in an end-to-end manner to form a long simulated bamboo shoot 10 that can then be cut to size to make furniture or other decorative items.

Formed on one end of each tube segment 12, 12' 12" is a tapered wide opening 16 designed to receive the straight smaller end 14' of a longitudinally aligned second tube segment 12'. The tapered wide opening end 16 of the first tube segment 12 is cut at a small acute angle. When the straight small end 14' of a second tube segment 16' is inserted into the tapered wide opening 16 on the first tube segment 12, the longitudinal axis of the two tube segments 12, 12' maybe slightly offset, thereby creating a simulated bamboo 10 shoot made of two segments slightly curved or bent.

After the two tube segments 12, 12' are longitudinally aligned and forced together, they are then welded together with a solder 50 made of the type of tubing. When copper tubing is used, an oxidizing agent is applied to the joint 20 and to the outer surfaces of the two tube segments 12, 12' to create a dark ring around the joint 20 and randomly disposed green and brown surfaces that closely match natural bamboo. When aluminum or steel tubing is used, a layer of paint is applied to the joint and outer surfaces to simulate natural bamboo. An additional benefit of using solder is that it creates a ring around the joint that simulates natural bamboo. If aluminum or steel tubing is used, a copper-base metallic paint may be applied to the joint and outer surface and which may be treated with an oxidized agent to make it simulate natural bamboo.

Figure 2A:
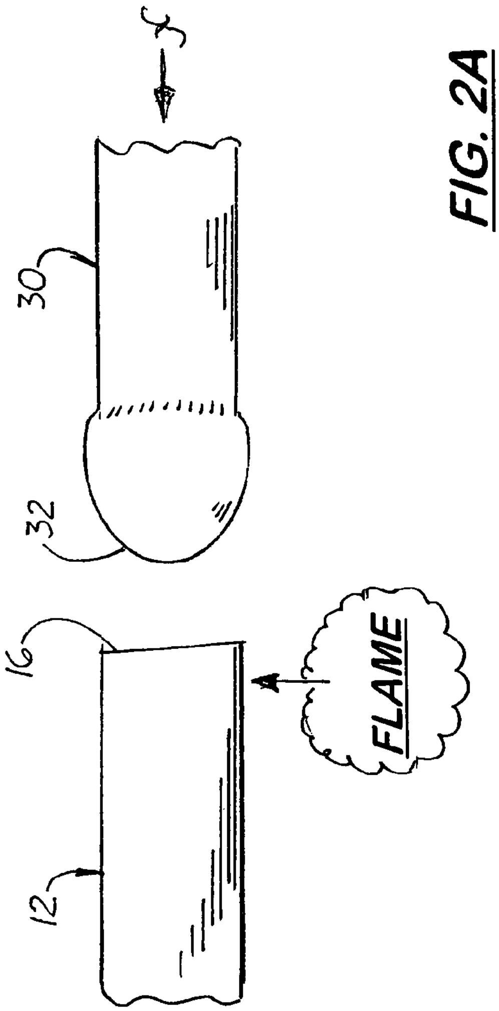
FIGS. 2A and B are two sided elevational views showing a cone-headed adaptor being forced into the heat end of a long segment of copper tubing to form a nodule.
Figure 2B:
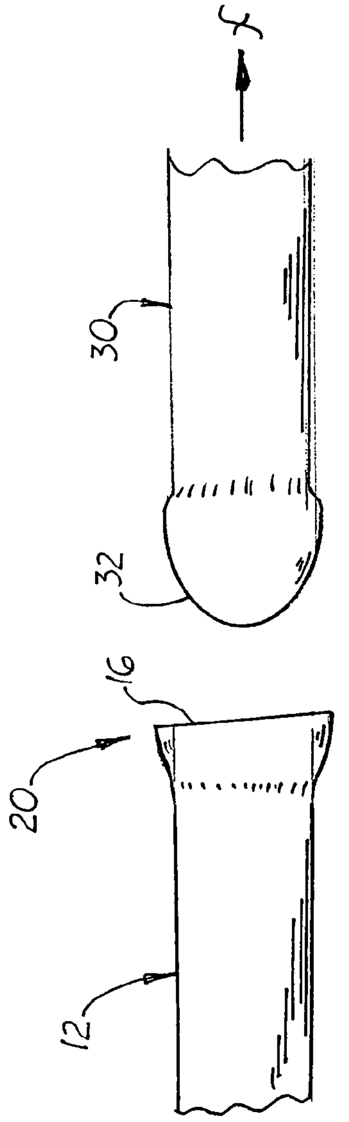

There are two methods to create a tapered wide opening on a tube section. The first way is shown in FIGS. 2A and B that uses a cone-headed adaptor 32 that is forced into the open end of the long segment of copper tubing. The outer surface of the cone-headed adaptor 32 is gradually curved that forces the side walls of a tube segment 12 so that the straight end of an adjacent tube segment may be inserted into the tapered wide opening 16. The outer surface of the cone-headed adaptor 32 is gently curved to create a tapered end opening that closely simulates the nodule on natural bamboo shoot. This particular method of creating a tapered wide opening is useful when creating a nodule on a long tube segment. Typically, the long straight segment of copper tubing is held in a pipe-threading machine while the cone-headed adapter is attached to the tool die holder that selectively forces the adaptor into the open end of the tube segment. Frictional forces between the adapter and the tube section generate heat that softens the tube section. Alternatively, heat may be applied to the end of the tube section to expedite the process.

Figure 3A:
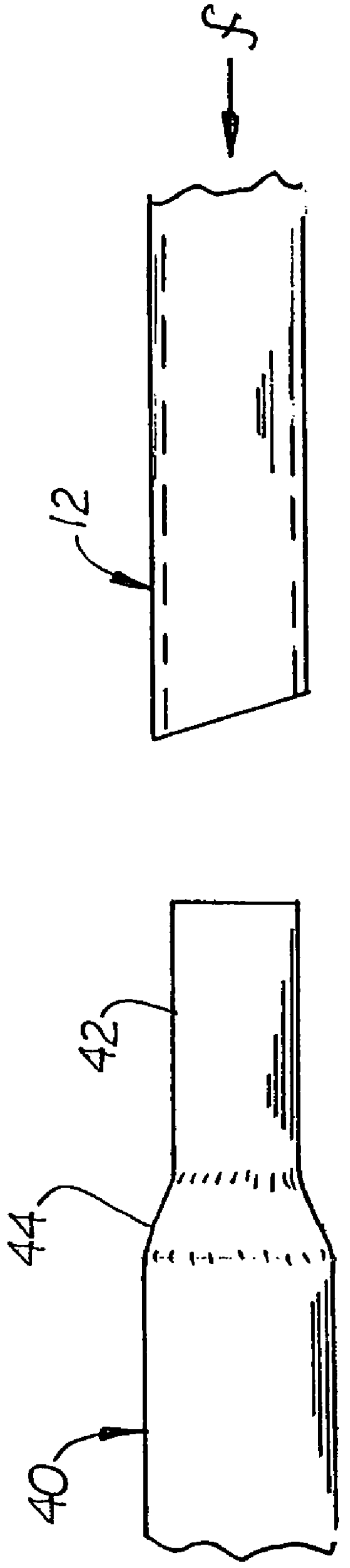
FIGS. 3A and B are partial side elevational views showing a second type of adapter being forced into the end of a segment of copper tubing to form a nodule.
Figure 3B:
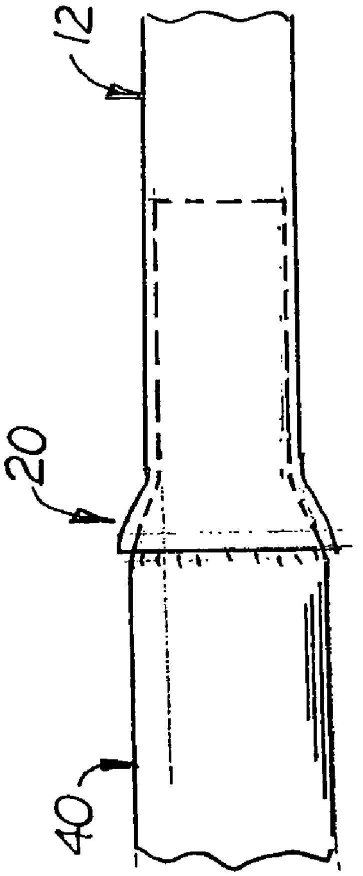

FIGS. 3A and B show a second alternative method to make a nodule 20 on a short tube segment 12. With this second method, a second adapter 40 is used that includes a narrow neck 42 designed to slide into the straight end opening on a tube segment 12. Located adjacent to the narrow neck is a conical-shaped intermediate section 44 that gradually increases in diameter and eventually terminates in a wide section. During use, the narrow neck 42 is inserted into the end of a tube segment 12 and a clamp is activated to apply a longitudinally directed force against the end surface of the wide section. Using this method, heat is applied from an external heat source to the end of the tube segment 12 while the intermediate section 44 is pressed into the end opening. Gradually, the end opening widens to create a tapered wide opening 16 and the simulated nodule 20. This particular method of making a tapered wide opening 16 and a nodule 20 is especially useful when making a bamboo shoot from short tube segments.

Before connecting two tube segments 12, 12' together, the tapered wide openings 16, 16' are cut at an angle 3 to 10 degrees. Two tube segments 12, 12' are then longitudinally aligned so that the straight end of one tube segment is inserted into the tapered wide opening of an adjacent tube segment. Flux is then applied to the joint. When the tube segments are made of copper, the joint is then heated and the two segments are welded together with solder. After the two segments and the solder have cooled, the outer surfaces of the two segments and the joint are then sanded or buffed to create a smooth surface.

When copper, aluminum or steel tubing covered with copper-based metallic paint is used, an acid oxidizing agent is then applied to the joint and to the outer surfaces of the two tube segments. A green-brown, randomly dispersed color is produced on outer surfaces of the two tube segments and a circular black line is created around the joint where the solder is located. Because the joint line is slanted and darker in color from the outer surface of the two tube sections, and because the outer surfaces of the two tube segments are green-brown and randomly dispersed, the two tube segments when joined closely match a natural bamboo shoot.

Figure 4:
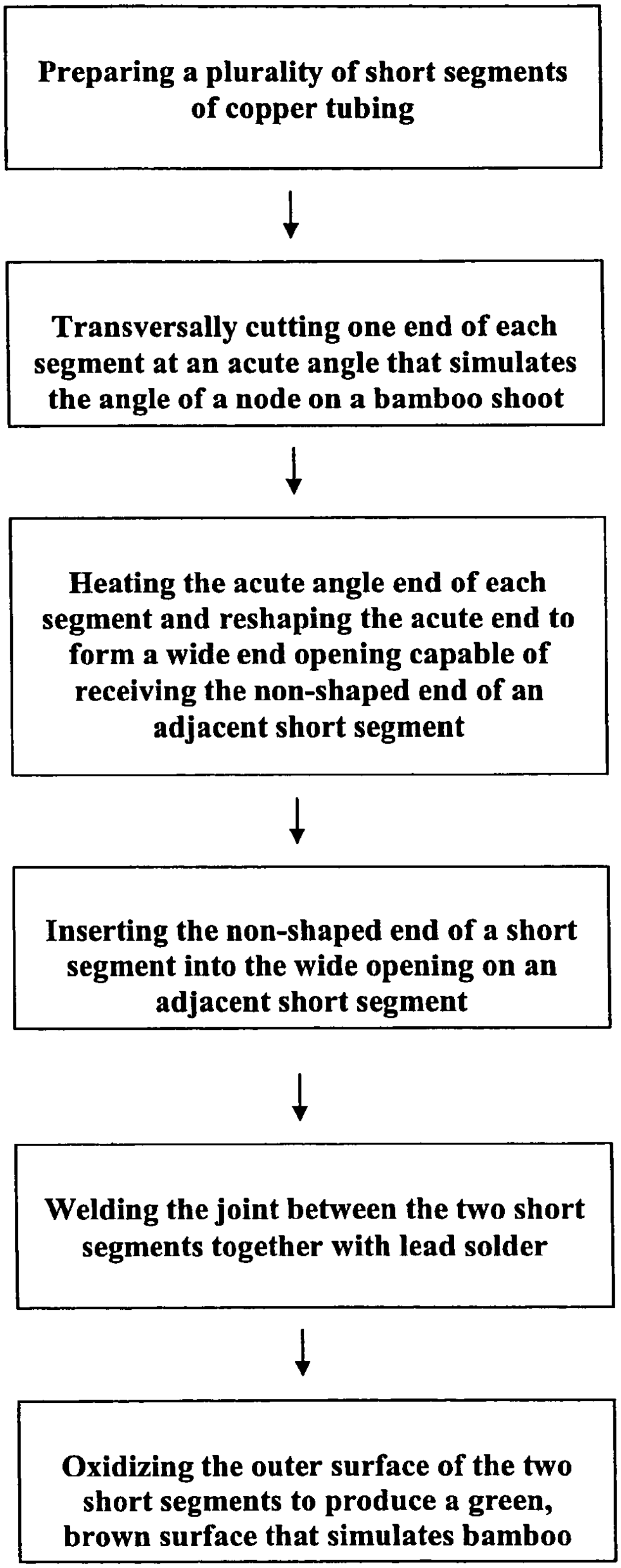
FIG. 4 is a flow diagram presenting the steps used to manufacture simulated bamboo using copper tubing.

FIG. 4 is a flow chart highlighting the steps used to make the bamboo simulated segments out of copper tubing.

Figure 5:
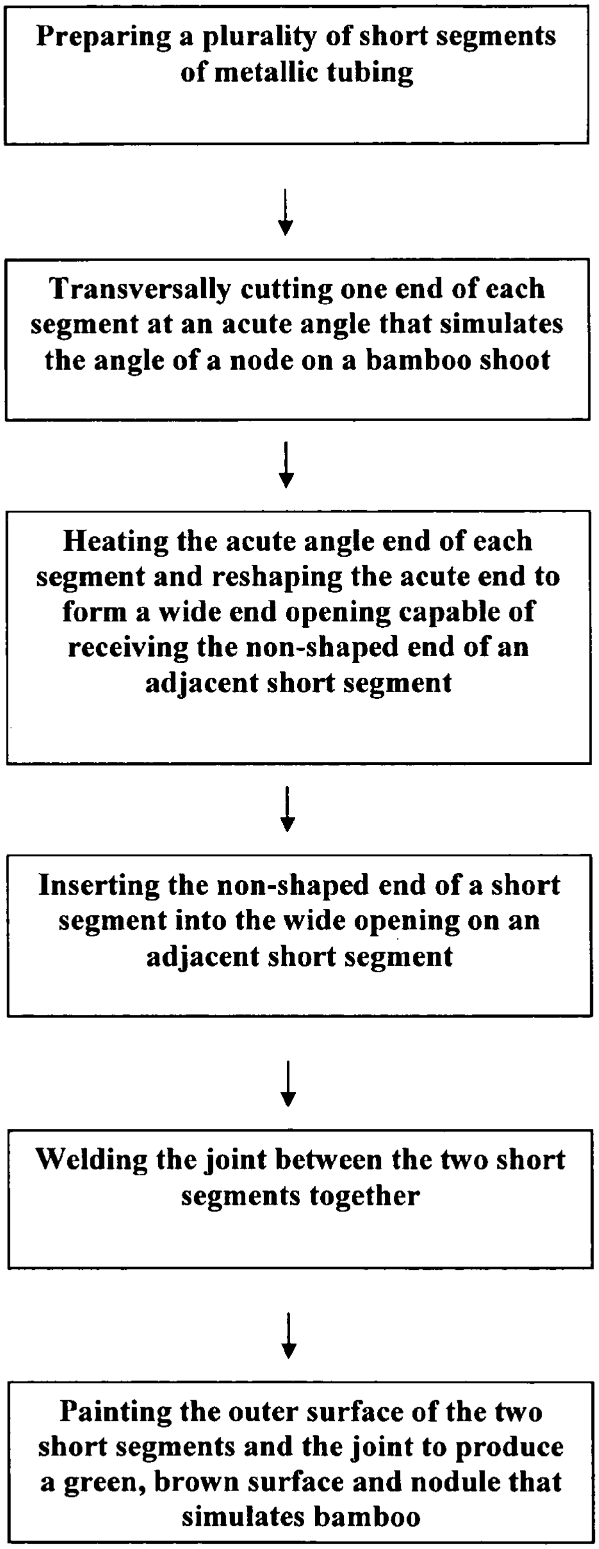
FIG. 5 is a flow diagram presenting the steps used to manufacture simulates bamboo using aluminum or steel tubing.

FIG. 5 is a flow chart highlighting the steps used to make the bamboo simulated segments out of aluminum or steel tubing. When aluminum or steel tubing is used, tube segments are joined together via arc welding. The outer surfaces of the tube segments are painted with brown and green paint to simulate bamboo. Brown and black paint is applied to the joint to simulate bamboo when galvanized steel tubing is used, oxidized acid may be used to darken the joint.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A method for preparing simulated bamboo comprising the following steps:

a. selecting at least a first segment of metal tubing and a second segment of metal tubing, each said first and second segments of tubing has at least two opposite ends;

b. re-shaping one said end of said first segment of metal tubing to make a tapered wide end with a wide opening capable of receiving said end of said second segment of metal tubing;

c. cutting said tapered wide end on said first segment of metal tubing at an acute angle;

d. inserting said end of said second segment of metal tubing into said wide opening on said tapered wide end on said first segment of metal tubing;

e. connecting said first segment of metal tubing and said second segment of metal tubing together thereby creating a joint between said first segment of metal tubing and said second segment of metal tubing to create a simulated bamboo shoot; and, f. removing any imperfections from said joint created between said first segment of metal tubing and said second segment of metal tubing.

2. The method, as recited in claim 1, wherein said first segment of metal tubing and said second segment of metal tubing are made of copper.

3. The method, as recited in claim 2, further including step (a) for applying an oxidizing agent to said joint to create a circular dark line around said joint and to create a random, green-brown color on the outer surfaces of said first segment of metal tubing and said second segment of metal tubing to simulate a bamboo shoot.

4. The method, as recited in claim 1, wherein said first segment of metal tubing and said second segment of metal tubing are made of aluminum.

5. The method, as recited in claim 4, further including step (a) of applying paint to the outer surfaces of said first segment of metal tubing and said second segment of metal tubing to simulate bamboo.

6. The method, as recited in claim 1, wherein said first segment of metal tubing and said second segment of metal tubing is made of steel.

7. The method, as recited in claim 6, further including step (g) applying a copper-based metallic paint to the outer surfaces of said first segment of metal tubing and said second segment of metal tubing.

8. The method, as recited in claim 7, further including step (h) for applying an oxidizing agent to the outer surfaces of said first segment of metal tubing and said second segment of metal tubing and to said joint to simulate a bamboo shoot.

9. The method, as recited in claim 6, further including step (a) applying paint to said first segment of metal tubing and said second segment of metal tubing to simulate bamboo.

* * * * *